(12) United States Patent
Friedmann et al.

(10) Patent No.: US 10,013,255 B2
(45) Date of Patent: *Jul. 3, 2018

(54) HARDWARE-BASED RUN-TIME MITIGATION OF CONDITIONAL BRANCHES

(71) Applicant: Centipede Semi Ltd., Netanya (IL)

(72) Inventors: Jonathan Friedmann, Even Yehuda (IL); Ido Goren, Herzliya (IL); Shay Koren, Tel-Aviv (IL); Noam Mizrahi, Hod Hasharon (IL); Alberto Mandler, Zihron Yaakov (IL)

(73) Assignee: CENTIPEDE SEMI LTD., Netanya (IL)

( * ) Notice: Subject to any disclaimer, the term of this patent is extended or adjusted under 35 U.S.C. 154(b) by 191 days.

This patent is subject to a terminal disclaimer.

(21) Appl. No.: 15/077,936

(22) Filed: Mar. 23, 2016

(65) Prior Publication Data
US 2017/0123797 A1 May 4, 2017

Related U.S. Application Data

(60) Provisional application No. 62/249,278, filed on Nov. 1, 2015.

(51) Int. Cl.
*G06F 9/38* (2018.01)
*G06F 9/40* (2006.01)
(Continued)

(52) U.S. Cl.
CPC ........ *G06F 9/30058* (2013.01); *G06F 9/3867* (2013.01); *G06F 8/443* (2013.01);
(Continued)

(58) Field of Classification Search
CPC .. G06F 9/30058; G06F 9/3867; G06F 9/3836; G06F 9/30079; G06F 9/3017;
(Continued)

(56) References Cited

U.S. PATENT DOCUMENTS 5,450,585 A * 9/1995 Johnson ................ G06F 8/4451
717/156
5,659,752 A 8/1997 Heisch et al.
(Continued)

OTHER PUBLICATIONS

Tyson, G., "The effects of predicated execution on branch prediction", Proceedings of the 27th Annual International Symposium on Microarchitecture, pp. 196-206, Dec. 31, 1994.
(Continued)

*Primary Examiner* — Daniel H Pan
(74) *Attorney, Agent, or Firm* — D. Kligler IP Services Ltd.

(57) ABSTRACT

A method includes, in a processor, processing a sequence of pre-compiled instructions by an instruction pipeline of the processor. A first block of instructions is identified in the instructions flowing via the pipeline. The first block includes a conditional branch instruction that conditionally diverges execution of the instructions into at least first and second flow-control traces that differ from one another in multiple instructions and converge at a given instruction that is again common to the first and second flow-control traces. A second block of instructions, which is logically equivalent to the first block but replaces the first and second flow-control traces by a single flow-control trace, is created by the processor at runtime. The pipeline is caused to execute the second block instead of the first block.

36 Claims, 4 Drawing Sheets

(51) Int. Cl.
  *G06F 9/45* (2006.01)
  *G06F 9/30* (2018.01)
  *G06F 8/41* (2018.01)
  *G06F 9/455* (2018.01)

(52) U.S. Cl.
  CPC ...... *G06F 9/30061* (2013.01); *G06F 9/30065* (2013.01); *G06F 9/30079* (2013.01); *G06F 9/3842* (2013.01); *G06F 9/3844* (2013.01); *G06F 9/45516* (2013.01)

(58) Field of Classification Search
  CPC .. G06F 9/45516; G06F 9/45525; G06F 8/443; G06F 8/445; G06F 9/30065; G06F 9/30061; G06F 9/3842; G06F 9/3844
  USPC ......... 712/226, 214–219, 230–240; 717/151, 717/159, 161
  See application file for complete search history.

(56) References Cited

U.S. PATENT DOCUMENTS

| | | | |
|---|---|---|---|
| 6,662,294 B1 | 12/2003 | Kahle et al. | |
| 6,918,032 B1 | 7/2005 | Abdallah et al. | |
| 7,010,787 B2* | 3/2006 | Sakai | G06F 8/456 |
| | | | 712/E9.032 |
| 8,522,225 B2* | 8/2013 | Chen | G06F 8/433 |
| | | | 717/133 |
| 9,135,015 B1 | 9/2015 | Mizrahi et al. | |
| 9,208,066 B1 | 12/2015 | Mizrahi et al. | |
| 9,348,595 B1 | 5/2016 | Mizrahi et al. | |
| 9,430,244 B1 | 8/2016 | Tennenhaus et al. | |
| 2004/0064683 A1 | 4/2004 | Kalluri et al. | |
| 2004/0205739 A1* | 10/2004 | Haber | G06F 8/443 |
| | | | 717/151 |
| 2006/0064682 A1 | 3/2006 | Tanaka | |
| 2006/0277540 A1* | 12/2006 | Bhattacharya | G06F 11/3636 |
| | | | 717/174 |
| 2011/0197049 A1* | 8/2011 | Adir | G06F 9/3005 |
| | | | 712/234 |
| 2014/0281387 A1 | 9/2014 | Grochowski et al. | |
| 2015/0067214 A1* | 3/2015 | Henry | G06F 1/3237 |
| | | | 710/261 |
| 2015/0199228 A1 | 7/2015 | Pike | |
| 2017/0123798 A1* | 5/2017 | Friedmann | G06F 9/30058 |

OTHER PUBLICATIONS

International Application # PCT/IB2016/056042 Search Report dated Feb. 2, 2017.
Sinharoy et al., "IBM POWER8 processor core microarchitecture", IBM Journal of Research and Development, vol. 59, No. 1, Paper 2, 21 pages, Jan./Feb. 2015.
Mizrahi et al., U.S. Appl. No. 14/578,518, filed Dec. 22, 2014.
Mizrahi et al., U.S. Appl. No. 14/673,884, filed Mar. 31, 2015.
Mizrahi et al., U.S. Appl. No. 14/673,889, filed Mar. 31, 2015.
Mizrahi et al., U.S. Appl. No. 14/690,424, filed Apr. 19, 2015.
Mizrahi et al., U.S. Appl. No. 14/794,835, filed Jul. 9, 2015.
Tennenhaus et al., U.S. Appl. No. 14/960,385, filed Dec. 6, 2015.
Friedmann et al., U.S. Appl. No. 15/077,940, filed Mar. 23, 2016.
U.S. Appl. No. 15/077,940 office action dated Dec. 28, 2017.
Allen et al., "Conversion of control dependence to data dependence", Proceedings of the 10th ACM SIGACT-SIGPLAN symposium on Principles of programming languages (POPL), pp. 177-189, Jan. 24-26, 1983.

* cited by examiner

HARDWARE-BASED RUN-TIME MITIGATION OF CONDITIONAL BRANCHES

CROSS-REFERENCE TO RELATED APPLICATIONS

This application claims the benefit of U.S. Provisional Patent Application 62/249,278, filed Nov. 1, 2015. This application is related to a U.S. patent application entitled "Hardware-based run-time mitigation of blocks having multiple conditional branches," filed on even date. The disclosures of these related applications are incorporated herein by reference.

FIELD OF THE INVENTION

The present invention relates generally to processor design, and particularly to methods and systems for run-time processing of conditional instruction blocks.

BACKGROUND OF THE INVENTION

Most modern processors use branch prediction mechanisms to improve performance. While highly-accurate branch prediction can boost the processor performance considerably, branch misprediction may cause significant degradation in latency and efficiency.

Various techniques have been suggested for improving the performance of branch prediction, or to reduce the impact of branch misprediction. For example, the IBM POWER8™ processor is capable of eliminating some conditional branches that skip over a single instruction. When a conditional branch is followed by certain fixed-point or store instructions, the second instruction can be converted into a predicated operation to eliminate branch processing, including any possible mispredictions. This "instruction fusing" feature is described by Sinharoy et al., in "IBM POWER8 processor core microarchitecture," IBM Journal of Research and Development, volume 59, issue 1, January, 2015.

SUMMARY OF THE INVENTION

An embodiment of the present invention that is described herein provides a method including, in a processor, processing a sequence of pre-compiled instructions by an instruction pipeline of the processor. A first block of instructions is identified in the instructions flowing via the pipeline. The first block includes a conditional branch instruction that conditionally diverges execution of the instructions into at least first and second flow-control traces that differ from one another in multiple instructions and converge at a given instruction that is again common to the first and second flow-control traces. A second block of instructions, which is logically equivalent to the first block but replaces the first and second flow-control traces by a single flow-control trace, is created by the processor at runtime. The pipeline is caused to execute the second block instead of the first block.

In some embodiments, the instructions in the second block cannot be flushed due to misprediction of the conditional branch instruction. In some embodiments, one or more of the instructions in the second block include internal micro-ops that are not part of an instruction set of the processor. In an embodiment, identifying the first block and creating the second block include: upon a given occurrence of the first block, executing the instructions of the first block and creating the second block, and upon a subsequent occurrence of the first block, causing the pipeline to execute the second block instead of the first block.

In an embodiment, the conditional branch instruction specifies a branch condition, and creating the second block includes replacing one or more of the instructions of the first block with one or more conditional instructions having an execution condition that is a complement of the branch condition. In an alternative embodiment, the conditional branch instruction specifies a branch condition, and creating the second block includes replacing the conditional branch instruction with an instruction that sets a flag depending on an outcome of the branch condition, and replacing one or more of the instructions of the first block with one or more conditional instructions having an execution condition that depends on the flag.

In yet another embodiment, the conditional branch instruction specifies a branch condition, and creating the second block includes replacing one or more of the instructions of the first block with one or more alternative instructions that write to one or more non-architectural registers of the processor, and adding to the second block one or more instructions that choose, depending on an outcome of the branch condition, at least one non-architectural register from which to read. In still another embodiment, the conditional branch instruction specifies a branch condition, and creating the second block includes replacing the conditional branch instruction with an instruction that sets a flag depending on an outcome of the branch condition, and executing the instructions in the first block conditionally depending on the flag.

In a disclosed embodiment, processing the sequence of the instructions includes predicting a future flow-control trace of the sequence and fetching the instructions in accordance with the predicted flow-control trace, and creating the second block includes preventing prediction of at least one of the first and second flow-control traces. In an embodiment, creating the second block includes preventing the conditional branch instruction from diverging the execution of the instructions into the first and second flow-control traces.

In some embodiments, identifying the first block includes deciding whether or not to replace the first block by the second block based on at least one parameter selected from a group of parameters consisting of: a number of the instructions in the first block; past branch decisions of the conditional branch instruction; past predictability of the conditional branch instruction; types of the instructions in the first block; and dependencies between instructions in the first block. In some embodiments, the method includes reverting back to executing the first block in response to meeting a predefined criterion.

In an embodiment, identifying the first block includes forcing inspection of the different flow-control traces by overriding a branch condition specified in the conditional branch instruction, and inspecting the instructions in the different flow-control traces so as to decide whether or not to replace the first block by the second block. In an alternative embodiment, identifying the first block includes detecting that processing of the sequence follows one of the different flow-control traces that executes the instructions in the first block, and in response inspecting the instructions so as to decide whether or not to replace the first block by the second block.

In an example embodiment, the first block includes at least one additional conditional branch instruction. In an embodiment, identifying the first block includes identifying a program loop in which the conditional branch instruction serves as a loop branch, and creating the second block includes creating a first set of instructions that carry out a first iteration of the program loop unconditionally, and one or more second sets of instructions, which carry out respective subsequent iterations of the program loop and are each conditioned on an outcome of the loop branch in a previous iteration. In an embodiment, at least two iterations of the program loop differ in flow-control trace from one another.

In an embodiment, the conditional branch instruction includes an indirect branch, and creating the second block includes creating first instructions that follow the first flow-control trace and are conditioned on a first branch resolution of the indirect branch, and second instructions that follow the second flow-control trace and are conditioned on a second branch resolution of the indirect branch, different from the first branch resolution.

In another embodiment, causing the pipeline to execute the second block includes flushing one or more of the instructions of the second block, in response to an event that is different from misprediction of the conditional branch instruction.

There is additionally provided, in accordance with an embodiment of the present invention, a processor including an instruction pipeline and circuitry. The instruction pipeline is configured to process a sequence of pre-compiled instructions. The circuitry is configured to identify in the instructions flowing via the pipeline a first block of instructions, which includes a conditional branch instruction that conditionally diverges execution of the instructions into at least first and second flow-control traces that differ from one another in multiple instructions and converge at a given instruction that is again common to the first and second flow-control traces, to create, at runtime, a second block of instructions that is logically equivalent to the first block but replaces the first and second flow-control traces by a single flow-control trace, and to cause the pipeline to execute the second block instead of the first block.

There is also provided, in accordance with an embodiment of the present invention, a method including, in a processor, processing a sequence of pre-compiled instructions by an instruction pipeline of the processor. A first block of instructions is identified in the instructions flowing via the pipeline. The first block includes at least first and second conditional branch instructions that conditionally diverge execution of the instructions into a plurality of flow-control traces that differ from one another in multiple instructions and converge at a given instruction. A second block of instructions, which is logically equivalent to the first block but replaces the plurality of flow-control traces by a reduced set of one or more flow-control traces, having fewer flow-control traces than the first block, is created by the processor at runtime. The pipeline is caused to execute the second block instead of the first block.

In an embodiment, the first and second conditional branch instructions specify respective first and second branch conditions, and creating the second block includes replacing one or more of the instructions of the first block with one or more conditional instructions having an execution condition that depends on the first and second branch conditions. In another embodiment, the first and second conditional branch instructions specify respective first and second branch conditions, and creating the second block includes replacing the first and second conditional branch instructions with one or more instructions that set one or more flags depending on outcomes of the first and second branch conditions, and replacing one or more of the instructions of the first block with one or more conditional instructions having an execution condition that depends on the one or more flags.

In yet another embodiment, the first and second conditional branch instructions specify respective first and second branch conditions, and creating the second block includes replacing one or more of the instructions of the first block with one or more alternative instructions that write to one or more non-architectural registers of the processor, and adding to the second block one or more instructions that choose, depending on respective outcomes of the first and second branch conditions, at least one non-architectural register from which to read. In still another embodiment, the first and second conditional branch instructions specify respective first and second branch conditions, and creating the second block includes replacing the first and second conditional branch instructions with instructions that set one or more flags depending on outcomes of the first and second branch conditions, and configuring one or more execution units of the processor to execute the instructions in the first block conditionally depending on the one or more flags.

In some embodiments, each of the first and second conditional branch instructions includes either a forward branch or a backward branch. In an embodiment, the first and second conditional branch instructions have a same target address. In a disclosed embodiment, the first conditional branch instruction has a first address and a first target address higher than the first address, and the second conditional branch instruction has a second address and a second target address higher than the second address, such that the second address is between the first address and the first target address, and the second target address is higher than the first target address. In an alternative embodiment, the first conditional branch instruction has a first address and a first target address lower than the first address, and the second conditional branch instruction has a second address and a second target address lower than the second address, such that the second target address is between the first target address and the first address, and the second address is higher than the first address.

In some embodiments, creating the second block includes modifying a target address of at least one of the first and second conditional branch instructions. In some embodiments, creating the second block includes modifying a branch condition of at least one of the first and second conditional branch instructions.

There is further provided, in accordance with an embodiment of the present invention, a processor including an instruction pipeline and circuitry. The instruction pipeline is configured to process a sequence of pre-compiled instructions. The circuitry is configured to identify in the instructions flowing via the pipeline a first block of instructions, which includes at least first and second conditional branch instructions that conditionally diverge execution of the instructions into a plurality of flow-control traces that differ from one another in multiple instructions and converge at a given instruction, to create, at runtime, a second block of instructions that is logically equivalent to the first block but replaces the plurality of flow-control traces by a reduced set of one or more flow-control traces, having fewer flow-control traces than the first block, and to cause the pipeline to execute the second block instead of the first block.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and devices for reducing the performance degradation caused by branch misprediction. In the disclosed embodiments, a processor comprises an instruction pipeline that processes pre-compiled program code. The processor monitors the instructions that flow through its pipeline and identifies, at runtime, one or more "conditional blocks" of instructions. A conditional block comprises a conditional branch instruction that diverges the execution flow into at least first and second flow-control traces. The first and second traces differ from one another in multiple instructions, and then converge at a given instruction that is again common to the first and second flow-control traces.

The conditional branch instruction is typically located at the beginning of the conditional block. In some cases the conditional branch instruction is a forward branch. In other cases, the conditional branch instruction is a backward branch. Moreover, the conditional block may comprise additional conditional branch instructions that further diverge the execution into one or more additional traces.

For at least one of the identified conditional blocks, the processor creates an alternative block of internal micro-ops, which are then processed by the pipeline instead of the original instructions of the conditional block. The alternative block is logically equivalent to the conditional block, but merges the first and second traces into a single flow-control trace.

In an example embodiment, the processor creates the alternative block by (i) forcing the conditional branch instruction to be not taken (or omitting the conditional branch instruction altogether), and (ii) replacing the instructions within the block with conditional instructions, in which the condition is the complement of the branch condition of the omitted conditional branch instruction. Other implementations are also feasible, and described below. Forcing the conditional branch instruction to be not taken can be implemented in various way, e.g., by predicting that the branch will not be taken, or by not flushing the instructions that follow the branch (inside the conditional block) even when the condition for taking the branch is met.

In an alternative embodiment, the processor creates the alternative block by (i) replacing the conditional branch instruction with an instruction that sets a dedicated flag depending on the branch condition of the original conditional branch instruction (or adding the flag-setting instruction and forcing the conditional branch instruction to be not taken), and (ii) replacing the instructions within the block with conditional instructions that depend on the dedicated flag.

In another alternative embodiment, the processor creates the alternative block by (i) replacing the conditional branch instruction with an instruction that sets a dedicated flag depending on the branch condition of the original conditional branch instruction (or adding the flag-setting instruction and forcing the conditional branch instruction to be not taken), (ii) replacing the destination registers in the instructions within the block with dedicated, non-architectural registers, and (iii) adding an additional selecting instruction that takes the correct result based on the flag.

In yet another alternative embodiment, the processor creates the alternative block by (i) replacing the conditional branch instruction with an instruction that sets a dedicated flag depending on the branch condition of the original conditional branch instruction (or adding the flag-setting instruction and forcing the conditional branch instruction to be not taken), (ii) configuring the execution units of the processor to execute the instructions in the block conditionally, depending on the flag. In this implementation, the instructions in the block are not modified. Instead, the execution units are aware of the flag and use it to execute the instructions conditionally.

Note that some Instruction Set Architectures (ISAs) comprise instructions that load the processor's Program Counter (PC) register. Such instructions, although not explicitly called branches, essentially function as indirect branches. In the present context, an instruction that loads the PC register is also regarded herein as a conditional branch instruction.

By processing an alternative block instead of a conditional block, the processor eliminates the negative impact of mispredicting the conditional branch instruction at the beginning of the block. This impact is especially severe when the instruction pipeline is long, e.g., on the order of fifteen cycles.

Replacing a conditional block with an alternative block, however, has its price in performance. In the "original" conditional block, the instructions within the block are processed only if the branch decision in the conditional branch instruction at the beginning of the block is "not taken." If the branch decision is "taken," the instructions within the block are skipped. In the alternative block, on the other hand, the instructions within the block are processed regardless of the branch decision.

Therefore, in some embodiments it is desired to replace a conditional block with an alternative block when the conditional branch is not predicted well. For well-predicted branch instructions, and for branch instructions that are mostly "taken," it may be preferable to retain the original conditional block. Some factors that may affect the cost-effectiveness of replacement are, for example, the prediction quality of the initial branch instruction, the number and types of instructions in the conditional block, and the history and statistics of branch decisions. In some embodiments, the processor evaluates the above factors and decides, per conditional block, whether to create and use an alternative block or not.

In some embodiments, the processor replaces conditional blocks with alternative blocks at runtime, using hardware that monitors and manipulates the instructions that are fetched and decoded in the instruction pipeline. It may be possible in principle to replace conditional blocks with alternative blocks in advance, during compilation, rather than at runtime. A compiler, however, is highly disadvantaged in successfully eliminating conditional blocks, as it is not aware of the dynamic behavior of the branches.

For example, the compiler has no information as to the actual performance of branch prediction, and has no access to the history and success/failure statistics of branch decisions. Moreover, in the disclosed runtime schemes the alternative block is made-up of internal micro-ops, which are not necessarily part of the instruction set of the processor that is supported by the compiler. For example, some processor instruction sets are relatively poor in conditional instructions, a deficiency that severely limits compilation-time replacement schemes.

The disclosed run-time schemes are not limited in this manner, and may be designed with any desired internal micro-ops for facilitating the conditional block replacement.

Furthermore, the alternative block may contain additional branch instructions. As will be described below, some of the disclosed run-time techniques operate efficiently by taking into consideration the joint behavior of multiple branches. A compiler is inherently unable to make these considerations. Moreover, a compiler is unable to take into account variations in branch behavior over time.

Several example techniques for creating alternative blocks, and for controlling the pipeline in processing the alternative blocks, are described herein. Some of the techniques described below replace complex conditional blocks, such as blocks that comprise multiple forward and/or backward conditional branches.

System Description

Figure 1:
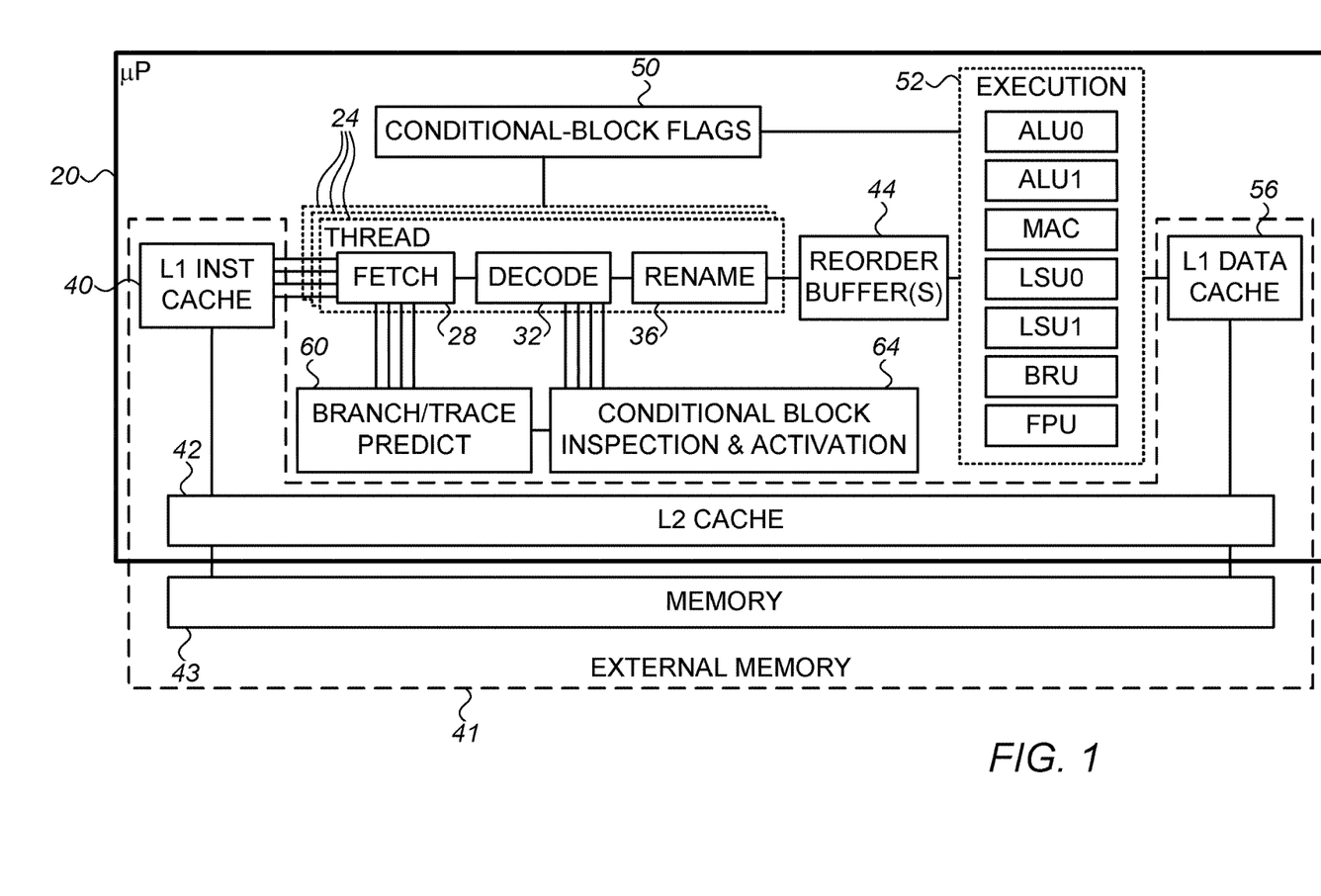
FIG. 1 is a block diagram that schematically illustrates a processor, in accordance with an embodiment of the present invention.

FIG. 1 is a block diagram that schematically illustrates a processor 20, in accordance with an embodiment of the present invention. Processor 20 runs pre-compiled software code, while replacing conditional blocks with alternative blocks at runtime.

In the present example, processor 20 comprises multiple hardware threads 24 that are configured to operate in parallel. Each thread 24 is configured to process one or more respective segments of the code. Certain aspects of thread parallelization are addressed, for example, in U.S. patent application Ser. Nos. 14/578,516, 14/578,518, 14/583,119, 14/637,418, 14/673,884, 14/673,889 and 14/690,424, 14/794,835, 14/924,833 and 14/960,385, which are all assigned to the assignee of the present patent application and whose disclosures are incorporated herein by reference. Although the present example refers to a multi-thread processor, the disclosed techniques are similarly applicable to single-thread processors, as well. Although the embodiments described herein refer mainly to an out-of-order processor, the disclosed techniques can be used in in-order processors, as well.

In the present embodiment, each thread 24 comprises a fetching unit 28, a decoding unit 32 and a renaming unit 36. Fetching units 24 fetch the program instructions of their respective code segments from a memory, e.g., from a multi-level instruction cache. In the present example, processor 20 comprises a memory system 41 for storing instructions and data. Memory system 41 comprises a multi-level instruction cache comprising a Level-1 (L1) instruction cache 40 and a Level-2 (L2) cache 42 that cache instructions stored in a memory 43. Decoding units 32 decode the fetched instructions.

Renaming units 36 carry out register renaming. The decoded instructions provided by decoding units 32 are typically specified in terms of architectural registers of the processor's instruction set architecture. Processor 20 comprises a register file that comprises multiple physical registers. The renaming units associate each architectural register in the decoded instructions to a respective physical register in the register file (typically allocates new physical registers for destination registers, and maps operands to existing physical registers).

The renamed instructions (e.g., the micro-ops/instructions output by renaming units 36) are buffered in-order in one or more Reorder Buffers (ROB) 44, also referred to as Out-of-Order (OOO) buffers. In alternative embodiments, one or more instruction queue buffers are used instead of ROB. The buffered instructions are pending for out-of-order execution by multiple execution units 52, i.e., not in the order in which they have been fetched.

The renamed instructions buffered in ROB 44 are scheduled for execution by the various execution units 52. Instruction parallelization is typically achieved by issuing one or multiple (possibly out of order) renamed instructions/micro-ops to the various execution units at the same time. In the present example, execution units 52 comprise two Arithmetic Logic Units (ALU) denoted ALU0 and ALU1, a Multiply-Accumulate (MAC) unit, two Load-Store Units (LSU) denoted LSU0 and LSU1, a Branch execution Unit (BRU) and a Floating-Point Unit (FPU). In alternative embodiments, execution units 52 may comprise any other suitable types of execution units, and/or any other suitable number of execution units of each type. The cascaded structure of threads 24 (including fetch units 28, decoding units 32 and renaming units 36), ROB and execution units 52 is referred to herein as the pipeline of processor 20.

The results produced by execution units 52 are saved in the register file, and/or stored in memory system 41. In some embodiments the memory system comprises a multi-level data cache that mediates between execution units 52 and memory 43. In the present example, the multi-level data cache comprises a Level-1 (L1) data cache 56 and L2 cache 42.

In some embodiments, the Load-Store Units (LSU) of processor 20 store data in memory system 41 when executing store instructions, and retrieve data from memory system 41 when executing load instructions. The data storage and/or retrieval operations may use the data cache (e.g., L1 cache 56 and L2 cache 42) for reducing memory access latency. In some embodiments, high-level cache (e.g., L2 cache) may be implemented, for example, as separate memory areas in the same physical memory, or simply share the same memory without fixed pre-allocation.

A branch/trace prediction unit 60 predicts branches or flow-control traces (multiple branches in a single prediction), referred to herein as "traces" for brevity, that are expected to be traversed by the program code during execution by the various threads 24. Based on the predictions, branch prediction unit 60 instructs fetching units 28 which new instructions are to be fetched from memory. Branch/trace prediction in this context may predict entire traces for segments or for portions of segments, or predict the outcome of individual branch instructions.

In some embodiments, processor 20 comprises a conditional-block inspection and activation unit 64. Unit 64 identifies conditional blocks, selects conditional blocks to be replaced with alternative blocks, and controls the various elements of the pipeline and the processor in general to perform the replacement. The internal structure and operation of unit 64, and the interaction of unit 64 with other elements of processor 20, are described in detail below. In some embodiments, processor 20 further comprises one or more dedicated flags 50, which are dedicated for conditional-block replacement. The use of flags 50 is also explained below.

Runtime Replacement of Conditional Blocks with Alternative Blocks

In some embodiments, unit 64 monitors the instructions that flow through the pipeline of processor 20, and identifies conditional blocks that should be replaced with alternative blocks. In the present context, the term "Conditional Block" (CB) refers to a block or instructions, i.e., a portion of the compiled code, which comprises a conditional branch instruction that diverges the execution flow into at least first and second flow-control traces. The first and second traces differ from one another in multiple instructions, and then converge at a given instruction that is again common to the first and second flow-control traces. The conditional block may comprise one or more additional conditional branch instructions that further diverge the execution into one or more additional traces.

For the sake of clarity, the embodiments described below refer mainly (but not exclusively) to a conditional forward branch instruction. This configuration, however, is not mandatory. For example, in some embodiments the conditional branch instruction is a backward branch.

Typically, unit 64 identifies CBs early in the pipeline, e.g., at the decoding stage by decoding unit 32. For at least one of the identified CBs, the processor creates an alternative block of internal micro-ops, which are then processed by the pipeline instead of the conditional block. The alternative block is logically equivalent to the conditional block, but merges the first and second traces into a single flow-control trace. In the context of the present patent application and in the claims, the term "internal micro-ops" refers to micro-ops that are not necessarily part of the instruction set of the processor. In other words, one or more of the internal micro-ops are not recognized or supported by the compiler that compiled the program code. The internal micro-ops are, however, recognized by the various processor elements, e.g., by execution units 52.

Figure 2:
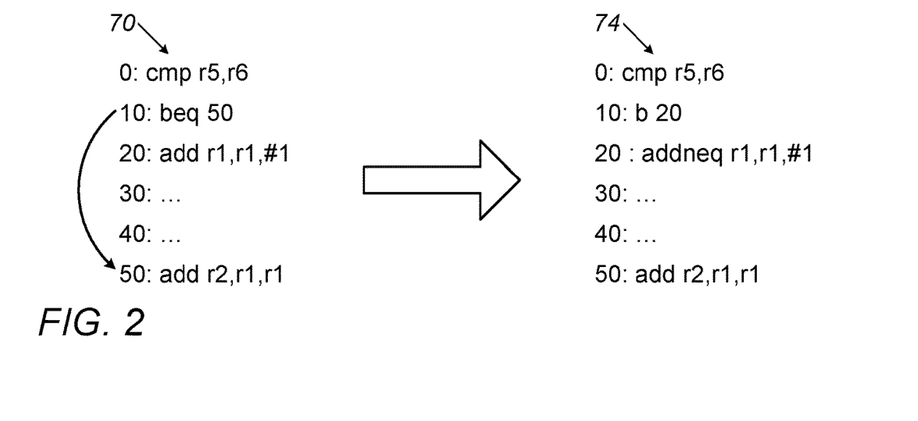
FIG. 2 is a diagram showing example replacement of a conditional instruction block, in accordance with an embodiment of the present invention.

FIG. 2 is a diagram showing example replacement of a conditional block, in accordance with an embodiment of the present invention. The left-hand-side of the figure shows a CB 70, as it is detected by unit 64 in the instructions being decoded by decoding unit 32. The right-hand-side of the figure shows an equivalent alternative block 74 created by unit 64.

In the present example, conditional block 70 spans lines 10-50. The conditional branch instruction "beq 50" at line 10 checks the value of the "eq" flag, which is determined by the comparison instruction "cmp r5,r6" at line 0. If r5=r6 (eq="1"), the branch is taken, and execution jumps to the "add r2,r1,r1" instruction at line 50. If r5≠r6 (eq="0"), the branch is not taken, and execution proceeds to the "add r1,r1,#1" instruction at line 20.

Thus, the conditional instruction at the beginning of the conditional block ("beq 50") conditionally diverges execution into two possible flow-control traces. One trace jumps from line 10 to line 50, whereas the other trace enters the conditional block and traverses lines 10, 20, 30, 40 and 50. At line 50 the two traces converge, and this instruction is regarded as the end of the conditional block.

Alternative block 74, on the right-hand-side of the figure, is logically equivalent to conditional block 70, but has only one possible trace. To replace CB 70 with block 74, unit 64 replaced the conditional branch "beq 50" with a non-conditional branch instruction "b 20" that simply proceeds to the next line. Alternatively, the "beq 50" instruction may be replaced by a "nop" instruction or by another instruction that proceeds to the next line and does not branch. Further alternatively, when the instruction at line 10 is fetched, branch prediction may be forced to be "not taken" and the next fetch is from line 20. In the decoder, the instruction of line 10 may be left unchanged (i.e., "beq 50") but with a marking that instructs the BRU not to produce a flush once the condition for taken is met.

The instructions within the CB (at lines 20, 30, 50) have been replaced with conditional instructions in which the condition is the complement of the branch condition of the (now removed) conditional branch "beq 50". For example, the "add r1,r1,#1" instruction at line 20 has been replaced with a conditional "addneq r1,r1,#1" instruction. In the latter instruction, the addition is performed only if the "eq" flag is not set, i.e., eq="0". As such, the instructions at lines 20-40 of alternative block 74 are performed only if r5≠r6, exactly the same as in CB 70. Nevertheless, regardless of whether r5=r6 or r5≠r6, execution of alternative block 74 traverses only a single trace, instead of the two possible traces in CB 70.

In various embodiments, unit 64 may use various mechanisms for omitting or degenerating the conditional branch instruction (e.g., the "beq 50" at line 10 of block 70). Unit 64 may drop the branch instruction altogether, e.g., not pass it to the decoding unit or instruct to the decoding unit not to output it. Alternatively, unit 64 may transfer the branch instruction to some point in the pipeline after the execution unit, so that the BRU will not execute it (In this embodiment, the branch prediction process carried out by unit 60 will still take the branch instruction into account).

Further alternatively, unit 64 may allow the branch instruction to flow through the pipeline and reach the BRU, but instruct the BRU to force a constant branch decision (e.g., not taken) regardless of the actual outcome of the branch condition. Furthermore, unit 64 prevents flushing the instructions in the conditional block by the BRU (by marking the branch instruction and thus indicating to the BRU to avoid a flush), regardless of the actual resolution of the branch condition. In this case, the branch prediction process of unit 60 may take the difference into account and gain from it (e.g., update the branch prediction according to the actual resolution of the branch condition, so as to improve subsequent decisions of whether or not to replace the CB).

When processing block 74 instead of block 70, no branch misprediction can occur. Therefore, the instructions within the block cannot be flushed due to misprediction of the original conditional branch. On the other hand, the instructions at lines 10-50 are processed unconditionally and never skipped over. Thus, this replacement is not always desirable. Methods and criteria for deciding whether or not to replace a CB are addressed further below.

It should be emphasized that the instructions inside the alternative block are protected from flushing (as described above), but only if the trigger from flushing is misprediction of the respective conditional branch. The instructions inside the alternative block (or some of them) may well be flushed due to other reasons. For example, an alternative block may comprise internal branches that may be mis-predicted, or "Load-before-Store" (LBS) scenarios, or even a mispredicted branch well before the CB. These events are unrelated to the original conditional branch of the CB, and may still trigger flushing and recovery during processing of the alternative block.

The replacement scheme shown in FIG. 2 is depicted purely by way of example. In alternative embodiments, unit 64 may create alternative blocks in any other suitable way, and/or for replacing any other suitable type of conditional block. Additional examples are described further below.

For example, in an alternative embodiment unit 64 creates the alternative block by (i) replacing the conditional branch instruction at the beginning of block 70 with an instruction that sets a dedicated flag (one of flags 50 in FIG. 1) depending on the branch resolution (i.e., taken or not taken) of the original conditional branch instruction, and (ii) replacing the instructions within the block with conditional instructions that depend on the dedicated flag. For example, unit 64 may replace the branch instruction with an instruction that sets the dedicated flag to "1" if the resolution of the branch instruction is not taken, and to "0" if taken. Unit 64 replaces the instructions within the alternative block with conditional instructions that are executed only if the dedicated flag is set to "1". In this embodiment, the condition is not complemented. Note that the flag value represents the control-flow trace that is being traversed, out of the two possible traces.

In another alternative embodiment, unit 64 creates the alternative block by (i) replacing the conditional branch instruction with an instruction that sets a dedicated flag depending on the branch condition of the original conditional branch instruction (or adding the flag-setting instruction and forcing the conditional branch instruction to be not taken), (ii) replacing the destination registers in the instructions within the block with dedicated, non-architectural registers, and (iii) adding an additional selecting instruction (e.g., "CSEL") that takes the correct result based on the flag.

In yet another alternative embodiment, unit 64 creates the alternative block by (i) replacing the conditional branch instruction with an instruction that sets a dedicated flag depending on the branch condition of the original conditional branch instruction (or adding the flag-setting instruction and forcing the conditional branch instruction to be not taken), (ii) configuring the execution units of the processor to execute the instructions in the block conditionally, depending on the flag. In this implementation, the instructions in the block are not modified. Instead, the execution units are aware of the flag and use it to execute the instructions conditionally.

In some embodiments, after having replaced CB 70 with alternative block 74, unit 64 continues to monitor subsequent executions of alternative block 74. If a certain criterion is met, unit 64 may revert back to the original CB 70. For example, unit 64 may detect that the execution condition in the conditional instructions within the alternative block is met only rarely. In other words, unit 64 may find that, in most cases, the conditional instructions of the alternative block are traversed but not executed. In such a case, unit 64 may decide to revert back to the original CB 70.

Figure 3:
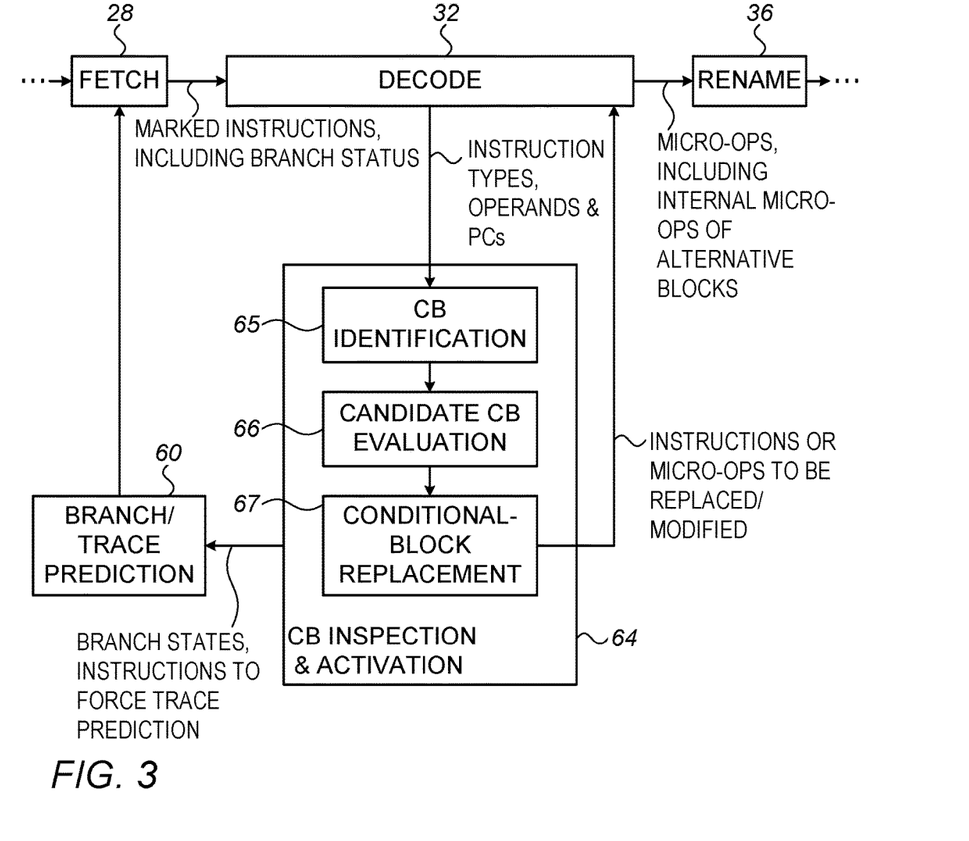
FIG. 3 is a block diagram that schematically illustrates a conditional-block inspection and activation unit, in accordance with an embodiment of the present invention.

FIG. 3 is a block diagram that schematically illustrates the internal structure of CB inspection and activation unit 64, in accordance with an example embodiment of the present invention. In alternative embodiments, unit 64 may comprise any other suitable internal structure and functionality.

In the present example, unit 64 comprises a CB identification module 65, a candidate CB evaluation module 66, and a CB replacement module 67. CB identification module 65 monitors the instructions being decoded by decoding unit 32 and identifies CBs. CB candidate evaluation module 66 checks and decides, for every CB that is identified by module 65, whether it is feasible and cost-effective to replace the CB with an alternative block. CB replacement module 67 performs the actual replacement of CBs with alternative blocks, for the CBs that were selected for replacement by module 66.

In an embodiment, CB identification module 65 is able to recognize CBs without waiting for the instructions to be fully decoded. For this purpose, it is typically sufficient for module 65 to receive, for each instruction, the Program Counter (PC) value, the instruction type, and possibly the instruction operand or operands. Other outputs of the decoding unit, e.g., destination registers, are typically not needed for identifying CBs.

CB evaluation module 66 may use various criteria for deciding whether or not to replace a given CB with an alternative block. Some example criteria comprise:

The number of instructions over which the two traces diverge. In the above example this number is the number of instructions that the conditional branch instruction jumps over (the address distance between the source and destination of the branch instruction). An exceedingly large number of instructions may incur large latency overhead if replaced with an alternative block, because the instructions in the alternative block are executed unconditionally. Therefore, module 66 may refrain from replacing blocks that are larger than a certain number of instructions.

The direction of the branch (forward or backward).

Historical data regarding success or failure of predicting the conditional branch (i.e., a measure of the quality with which the branch is predictable). CBs that begin with a poorly predicted branch are typically better candidates for replacement, because the resulting performance improvement is likely to be larger.

The percentage of times that the branch was taken. CBs that begin with a branch that is usually taken are less attractive for replacement, because the replacement will cause large latency degradation.

The types of instructions within the CB (e.g., whether the instructions set flags or not, whether or not additional conditional branches exist in the block, whether or not long-latency instructions exist in the block (e.g., floating point instructions) and/or whether or not there are "select" instructions in the block).

Whether branches within the CB are usually taken/not-taken.

Dependencies between instructions on the flow-control traces of the block. For example, if one trace has significant dependencies and another trace does not, the performance loss incurred by converting the CB may be too large.

In order to evaluate a given CB and decide whether or not to replace it, it is typically necessary to monitor the instructions within the block at least once. In an embodiment, module 66 waits for an opportunity in which the conditional branch is not taken (i.e., execution enters the conditional branch) and then monitors the instructions flowing in the pipeline. In these embodiments, the CB is executed at least once before it can be replaced. In an alternative embodiment, module 66 artificially forces the prediction of the branch by unit 60 to be "not taken", in order to monitor the instructions within the block. If the actual branch resolution of the branch is "taken" (i.e., the forced prediction was wrong), the instructions in the CB are flushed.

In some embodiments, module 67 assigns a respective state to each CB (or, equivalently to each conditional branch that begins a CB). The state may specify, for example, that the CB has never been monitored before for possible replacement, that the CB is currently undergoing monitoring, that the CB has been monitored and selected for replacement with an alternative block, or that the CB has been monitored and not selected for replacement. Module 67 typically maintains for each CB a state machine that moves between the states.

For a CB that is to be replaced, replacement module 67 typically notifies decoding unit 32 which instructions or micro-ops in the pipeline should be replaced or modified, and how. In other words, once a decision has been made to replace a given CB with an alternative block, replacement module 67 detects that the execution reached the PC of the beginning of this CB. From this point, replacement module 67 instructs the decoding unit to output the internal micro-ops of the alternative block instead of the original instructions of the CB. In some embodiments, modifying an instruction or micro-op may be performed by replacing a small number of bits in the decoded instructions output by the decoding unit.

In some embodiments, inspection & activation module 64 indicates the states of the various CBs to branch/trace prediction unit 60. Unit 60 transfers the state indications to fetch unit 28, and the fetch unit marks the instructions it outputs. Thus, at least some of the instructions flowing in the pipeline are marked with indications that specify whether they belong to a CB, and the state of the CB. This marking eliminates the need for extensive communication and synchronization between different processor units with regard to handling CBs.

In some embodiments, when unit 60 predicts entire traces (as opposed to predicting only individual branches), inspection & indication unit 64 indicates to unit 60 which traces should not be predicted as a result of replacing a CB with an alternative block. In the replacement shown in FIG. 2, for example, unit 64 may instruct unit 60 to stop predicting the trace that jumps from line 10 to line 50, i.e., stop predicting that the branch in line 10 is taken.

The configuration of unit 64 shown in FIG. 3, and the interaction of unit 64 with other elements of processor 20, are depicted purely by way of example. In alternative embodiments, any other suitable configurations can be used. For example, unit 64 may monitor the instructions at any other suitable point along the pipeline, typically at a point where the instructions are processed in-order (i.e., in the same order they were fetched by fetching unit 28).

Figure 4:
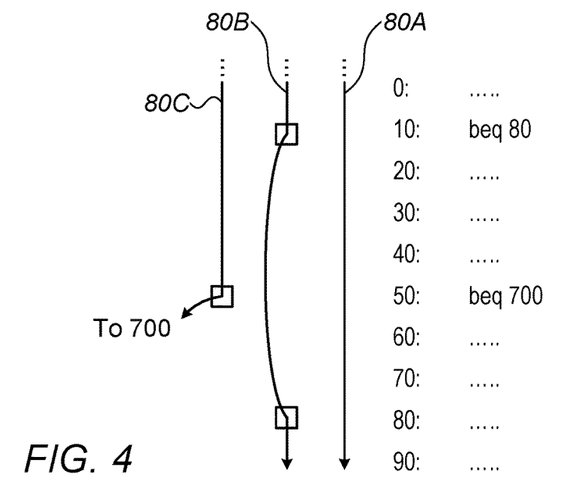
FIG. 4 is a diagram showing a conditional instruction block having three flow-control traces, of which two are merged in accordance with an embodiment of the present invention.

FIG. 4 is a diagram showing a conditional block having three possible flow-control traces, of which two are merged in accordance with an embodiment of the present invention. In the example of FIG. 4, the CB begins at the conditional branch instruction "beq 80" at line 10. At this point the execution diverges into two possible traces 80A and 80B.

Trace 80A, which is traversed when the branch at line 10 is not taken, enters the block and processes the instructions at lines 20-80 sequentially. Note that at line 50 trace 80A traverses another conditional branch ("beq 700"), and proceeds to line 60 only when this branch is not taken. In other words, trace 80A is traversed only when two conditions are met—When the branches at lines 10 and 50 are both not taken. Trace 80B, which is traversed when the branch at line 10 is taken, jumps directly to line 80. Thus, traces 80A and 80B merge again at line 80, which is the end of the CB.

A third trace, denoted 80C, is traversed when the branch at line 10 is not taken, and the branch at line 50 is taken. Trace 80C enters the block similarly to trace 80A, but exits the block at line 50 and jumps to line 700 (not shown).

In this sort of CB, unit 64 is able to merge two of the traces (80A and 80B) into a single trace by replacing the CB with an alternative block. The third trace (80C) cannot be merged. In other words, by using the disclosed technique, trace 80B is eliminated, and the number of possible traces is reduced from three to two.

In an embodiment, when monitoring this CB, unit 64 instructs branch/trace prediction unit 60 to stop predicting trace 80B, e.g., to unconditionally force a "not taken" branch decision for the "beq 80" instruction at line 10. From this point, only traces 80A and 80C can be predicted.

In this embodiment, when decoding reaches line 10, if the trace predicted by unit 60 is trace 80A, unit 64 replaces the CB with an alternative block, and instructs decoding unit 32 accordingly. If, on the other hand, the trace predicted by unit 60 is trace 80C, unit 64 does not replace the CB.

Note that, if the branch at line 10 is taken, the trace jumps over the conditional branch of line 50. When converting this CB, the conditional branch of line 50 should therefore be replaced with a branch that depends on two conditions—The original branch condition of the branch of line 50, and the complement of the branch condition of the branch of line 10. Similarly, if any of the instructions inside the CB is a conditional instruction, it should be replaced with an instruction that depends on two conditions—The original condition of the instruction being replaced, and the complement of the branch condition of the branch of line 10.

Figure 5:
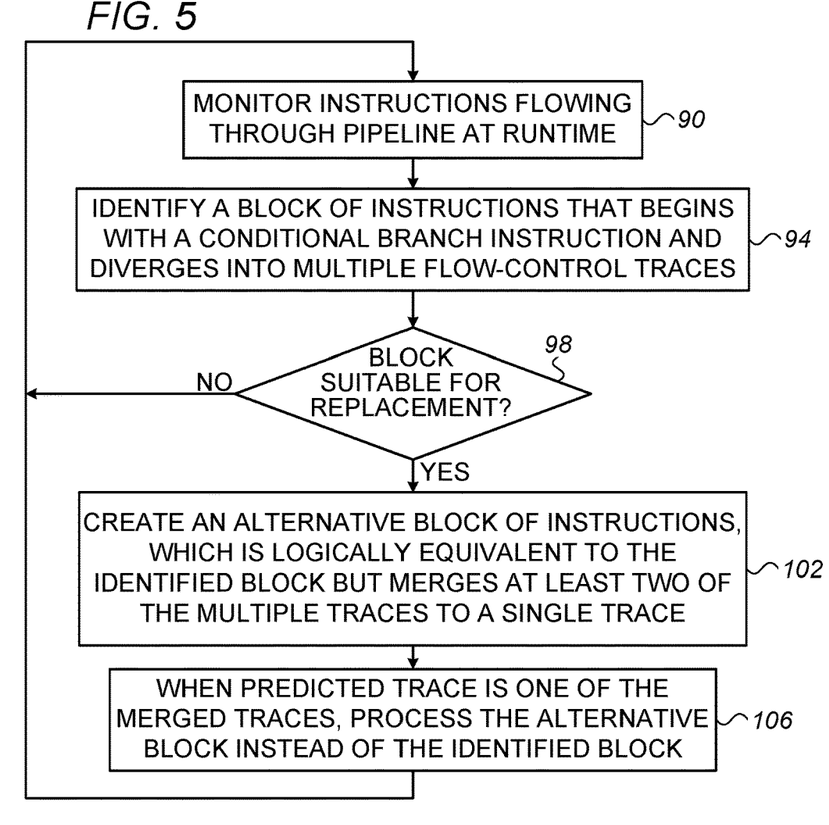
FIG. 5 is a flow chart that schematically illustrates a method for replacement of conditional instruction blocks, in accordance with an embodiment of the present invention.

FIG. 5 is a flow chart that schematically illustrates a method for replacement of conditional blocks, in accordance with an embodiment of the present invention. The method begins with unit 64 of processor 20 monitoring the instructions flowing through the pipeline at runtime, at a monitoring step 90. Unit 64 identifies a CB, at an identification step 94.

At a checking step 98, unit 64 checks whether the identified CB is suitable for replacement with an alternative block. If not, the method loops back to step 90 above. If the CB is to be replaced, and when the predicted trace is one of the merged traces that correspond to the alternative block, unit 64 instructs the pipeline to process the alternative block instead of the original CB, at a replacement step 106. The method then loops back to step 90 above.

Identification and Replacement of Conditional Blocks that Comprise Multiple Branch Instructions The embodiments described above referred mainly to replacement of a CB having a single branch instruction. In some embodiments, unit 64 evaluates and replaces more complex CBs having multiple branch instructions. In some embodiments, unit 64 of processor 20 replaces such CBs with alternative blocks by jointly considering the multiple branches. The disclosed techniques replace a given CB with an alternative block having fewer flow-control traces than the original CB. Several examples are explained and demonstrated below.

Figure 6:
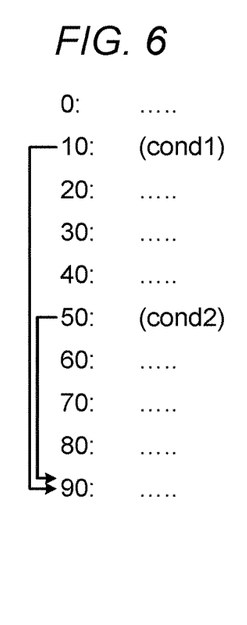
FIG. 6-8 are diagrams showing conditional instruction blocks containing two branch instructions, in accordance with embodiments of the present invention.

FIG. 6 is a diagram showing a conditional instruction block containing two conditional branch instructions, in accordance with an embodiment of the present invention. In the present example, a branch at line 10 has a branch condition denoted cond1, and a branch at line 50 has a branch condition denoted cond2. Both branches jump to the same target address—line 90.

There are several possibilities for replacing such a CB with an alternative block. In one embodiment, unit 64 replaces the CB by performing the following:

Omit the branch at line 10.
Replace the instructions at lines 20-40 with conditional instructions whose condition is the complement of cond1.
Replace the branch at line 50 with a branch that depends on both cond1 and cond2, namely a conditional branch whose branch condition is [cond2 or complement (cond1)].

This conversion scheme omits only the branch at line 10. In an alternative embodiment, unit 64 replaces the CB by performing the following:

Omit both the branch at line 10 and the branch at line 50.
Replace the instructions at lines 20-40 with conditional instructions whose condition is the complement of cond1.
Replace the instructions at lines 60-80 with conditional instructions that depend on both cond1 and cond2, namely conditional instructions whose condition is [complement(cond2) and complement(cond1)].

The latter conversion scheme omits both the branch at line 10 and the branch at line 50.

In yet another embodiment, unit 64 may replace the CB by performing the following:

Replace the branch at line 10 with an instruction that sets a dedicated flag denoted flag1 depending on cond1.
Replace the instructions at lines 20-40 with conditional instructions that depend on flag1.
Replace the branch at line 50 with an instruction that sets another dedicated flag denoted flag2 depending on flag2.
Replace the instructions at lines 60-80 with conditional instructions that depend on both flag1 and flag2.
(As explained above, omitting a conditional branch instruction typically means forcing the branch prediction to be not taken, and refraining from flushing the following instructions even in the execution units, even if the branch resolution is "taken.")

Figure 7:
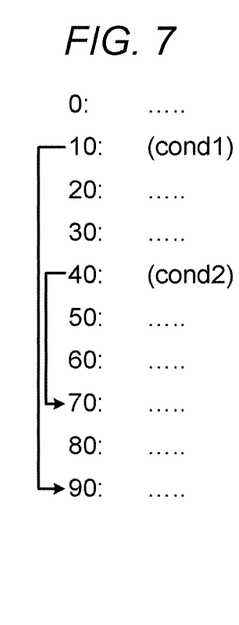

FIG. 7 is a diagram showing a conditional instruction block containing two conditional branch instructions, in accordance with another embodiment of the present invention. In the example of FIG. 7, one conditional branch (at line 40 with branch condition cond2) is nested inside another conditional branch (at line 10 with branch condition cond1). The two branches have different target addresses.

In this example too, unit 64 has several possibilities for replacing the CB with an alternative block, as described in FIG. 6 above. Some forms of replacement omit only the branch at line 10, while other forms of replacement omit both the branch at line 10 and the branch at line 40. When converting this CB, the instructions at lines 20, 30, 40, 70 and 80 are made conditional depending only on cond1. The instructions at lines 50-60 are made conditional depending on both cond1 and cond2.

Alternatively, unit 64 may convert the CB of FIG. 7 into an alternative block using dedicated flags:

Replace the branch at line 10 with an instruction that sets a dedicated flag denoted flag1 depending on cond1.
Replace the instructions at lines 20-40, 70 and 80 with conditional instructions that depend on flag1.
Replace the branch at line 40 with an instruction that sets another dedicated flag denoted flag2 depending on cond2.
Replace the instructions at lines 50-60 with conditional instructions that depend on both flag1 and flag2.

Figure 8:
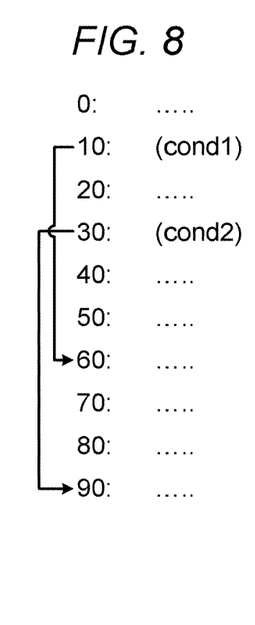

FIG. 8 is a diagram showing a conditional instruction block containing two conditional branch instructions, in accordance with yet another embodiment of the present invention. In this example, the two branches are interleaved, i.e., the second branch (line 30) is higher than the first branch (line 10), but the target address of the first branch (line 60) is between the second branch (line 30) and the target address of the second branch (line 90). When converting this CB, the instructions at line 20 and 30 are made conditional depending only on cond1. The instructions at lines 40-50 are made conditional depending on both cond1 and cond2. The instructions at lines 60-80 are made conditional depending only on cond2.

Alternatively, unit 64 may convert the CB of FIG. 8 into an alternative block using dedicated flags:

Replace the branch at line 10 with an instruction that sets a dedicated flag denoted flag1 depending on cond1.
Replace the instructions at lines 20 and 70-80 with conditional instructions that depend on flag1.
Replace the branch at line 30 with an instruction that sets another dedicated flag denoted flag2 depending on cond2.
Replace the instructions at lines 40-50 with conditional instructions that depend on both flag1 and flag2.

As explained above, omission and replacement of branch instructions are typically implemented by forcing the branch prediction to be "not taken," and instructing the BRU to refrain from flushing the following instructions even when the branch resolution is "taken."

The examples of FIGS. 6-8 demonstrate how unit 64 converts a CB containing multiple branch instructions, based jointly on the branch conditions of the multiple branch instructions. In the above examples, both branch instructions in the CB are conditional, and both are forward branches. In alternative embodiments, some of the branch instructions may be non-conditional, and any of the branch instructions may be a backward branch. Although the examples above refer to two branches having two conditions, for the sake of clarity, the disclosed techniques can be used in a similar manner with CBs having any desired number of branches and respective conditions.

Figure 9:
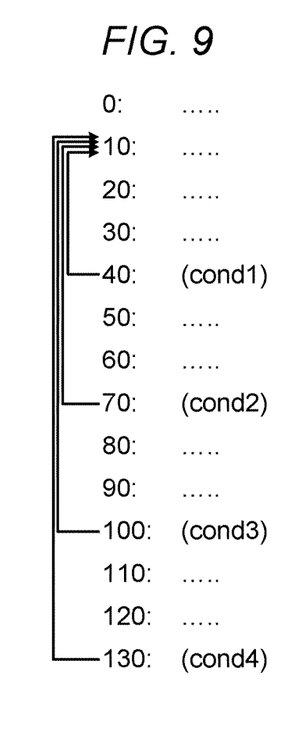
FIGS. 9 and 10 are diagrams showing conditional instruction blocks containing multiple backward branches, in accordance with embodiments of the present invention.

FIG. 9 is a diagram showing a conditional instruction block containing multiple backward branches, in accordance with an embodiment of the present invention. In this embodiment, the CB contains multiple (in the present example four) backward branches that jump to the same target address.

Unit 64 may convert this sort of CB into an alternative block in various ways. In one embodiment, unit 64 performs the following:

Omit the branch at line 40.
Replace the instructions at lines 50-60 with conditional instructions depending on the complement of cond1.
Replace the branch at line 70 with a branch that depends on [cond2 or complement(cond1)].

Additionally or alternatively, the branches at lines 100 and 130 can be combined in a similar manner. In yet another embodiment, unit 64 may combine more than two branches, e.g., all four branches in the CB. In such an embodiment, the resulting conditional instruction(s) will depend on more than two conditions, e.g., on all four conditions cond1 . . . cond4. Further additionally or alternatively, the CB of FIG. 9 may be converted using four dedicated flags and suitable flag-setting instructions, as described above.

Figure 10:
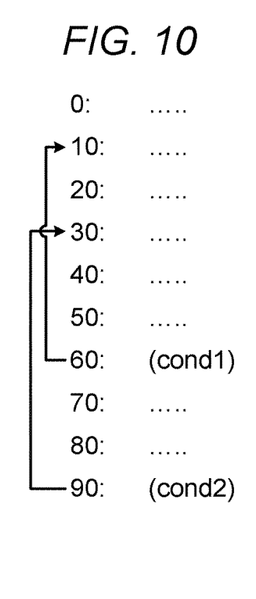

FIG. 10 is a diagram showing a conditional instruction block containing multiple backward branches, in accordance with an embodiment of the present invention. In this example the backward branches are interleaved, i.e., the second backward branch (line 90) is higher than the first backward branch (line 60), but the target address of the second branch (line 30) is between the first branch (line 60) and the target address of the first branch (line 10).

Using the disclosed techniques, unit 64 is able to replace the CB of FIG. 10 with an alternative block having only a single branch:

- Change the target address of the second branch to be the same as the target address of the first branch, i.e., change the target address of the branch at line 90 to be line 10 instead of line 30.
- Change the branch condition of the second branch to be [cond1 or cond2].
- Replace the instructions at lines 70-80 with conditional instructions that depend on complement(cond1).
- Replace the instructions at lines 10-20 with a conditional instruction that depends on (cond1).
- Replace the instructions at lines 30-60 with conditional instructions that depends on (cond1) or (cond2).

Alternatively, unit 64 may convert such a CB using any of the above-described schemes, e.g., flags and flag-setting instructions, using dedicated non-architectural registers, or using execution units that are capable of conditional operation depending on flags.

In various embodiments, unit 64 may use different techniques for identifying the complex conditional blocks of the kinds shown in FIGS. 6-10 above. For example, in order to identify instructions located are between two backwards branches to the same target address (such as in the CB of FIG. 10), unit 64 may perform the following:

- After partial decoding of a backwards branch, save its target address.
- When the branch is predicted to be "not taken," continue inspecting the instructions that follow the branch.
- When encountering the next branch (or one or more of the following branches), check if the target address is the same as the saved target address of the first branch. If so, consider processing the instructions between the two branches as a CB of the type shown in FIG. 10.

The decision above may be based on various factors, such as the number and/or properties of the instructions between the two backward branches, and the estimated misprediction probability of the branch. Additionally or alternatively, unit 64 may use any other suitable technique for identifying any of the CB types shown in FIGS. 2, 4 and 6-10, or any other suitable type of CB.

The CB replacement methods shown in FIGS. 6-10 above are example methods that are depicted purely for the sake of conceptual clarity. In alternative embodiments, unit 64 may replace any kind of conditional block using any of the techniques described above (e.g., using conditional instructions inside the alternative block, using flag-setting instructions and instructions that are conditioned on the flag or flags, or using non-architectural registers to serve as destination registers).

Treating Loop, Functions and Indirect Branches as Conditional Blocks

In some embodiments, unit 64 may use the above techniques to avoid branch misprediction when processing loops, particularly loops having a small number of iterations and/or loops whose branch is difficult to predict. Consider, for example, the following CB:

0: cmp r5,r6
10: add r1,r1,r5
20: ldr r5,[r1]
30: beq 0

Assume that at run-time, processor 20 carries out either a single iteration of the above loop, or two iterations, at random. In other words, assume that it is difficult to predict whether a single iteration or two iterations will be performed. If such a CB is replaced by an alternative block, the (very likely) misprediction events are avoided. When processing the alternative block, the processor will always perform two iterations of the loop, wherein the second iteration is conditional depending on the outcome of the branch condition (at line 30).

More generally, unit 64 may replace the code of a loop, and in particular a loop that is repeated for a number of times that is small and hard to predict, with an alternative block. In this alternative block, the first loop iteration is processed unconditionally. Each subsequent iteration is conditional on the outcome of the loop branch condition of the previous iteration. For example, in a given iteration (other than the first one), if the outcome of the backward branch condition at the end of the loop is "taken," then the next iteration is processed. If the outcome is "not taken," the loop is terminated. In some embodiments, all loop iterations follow the same flow-control trace. In other embodiments, at least two of the loop iterations differ in flow-control trace.

In yet another embodiment, unit 64 may regard a code having multiple returns from a function as a CB (which are chosen depending on the outcome of one or more conditional branch decisions) and replace it with an alternative block.

Yet another form of CB than can be replaced with an alternative block comprises an indirect branch that diverges the execution into two or more traces, which later converge. The target address of the indirect branch depends on the content of a register. In an embodiment, unit 64 may replace such a CB with an alternative block, in which the instructions of all traces are executed. The instructions of each trace, however, are made conditional on the corresponding resolution of the indirect branch.

Any of the techniques described above may be carried out while unit 60 operates in a branch prediction mode, i.e., predicts individual branches. In such embodiments, replacement of a CB with an alternative block is effective in eliminating mis-prediction of specific branches. In other embodiments, the techniques described above may be carried out while unit 60 operates in a trace prediction mode, i.e., predicts entire flow-control traces that comprise multiple branches. In such embodiments, replacement of a CB with an alternative block is effective in reducing the number of possible traces that need to be predicted and followed.

The description above refers to several example types of CB, for the sake of clarity. In alternative embodiments, unit 64 may identify and replace any other suitable type of CB.

The configurations of processor 20 and its various elements, as shown in FIGS. 1 and 3, are example configurations that are chosen purely for the sake of conceptual clarity. In alternative embodiments, any other suitable configurations can be used. For example, parallelization can be performed in any other suitable manner, or may be omitted altogether. The processor may be implemented without cache or with a different cache structure. The processor may comprise additional elements not shown in the figure. Further alternatively, the disclosed techniques can be carried out with processors having any other suitable micro-architecture. As another example, it is not mandatory that the processor perform register renaming.

In various embodiments, the task of replacing conditional blocks with alternative blocks may be carried out by unit 64, or it may be distributed between unit 64, unit 60 and/or other elements of the processor. In the context of the present patent application and in the claims, any and all processor elements that carry out the replacement of conditional blocks with alternative blocks is referred to collectively as "conditional-block processing circuitry" or simply "circuitry" for brevity.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a processor, processing a sequence of pre-compiled instructions by an instruction pipeline of the processor;
   identifying in the instructions flowing via the pipeline a first block of instructions, which comprises a conditional branch instruction that conditionally diverges execution of the instructions into at least first and second flow-control traces that differ from one another in multiple instructions and converge at a given instruction that is again common to the first and second flow-control traces;
   creating by the processor, at runtime, a second block of instructions that is logically equivalent to the first block but replaces the first and second flow-control traces by a single flow-control trace; and
   causing the pipeline to execute the second block instead of the first block, wherein the instructions in the second block cannot be flushed due to misprediction of the conditional branch instruction.

2. The method according to claim 1, wherein one or more of the instructions in the second block comprise internal micro-ops that are not part of an instruction set of the processor.

3. The method according to claim 1, wherein the conditional branch instruction specifies a branch condition, and wherein creating the second block comprises replacing one or more of the instructions of the first block with one or more conditional instructions having an execution condition that is a complement of the branch condition.

4. The method according to claim 1, wherein the conditional branch instruction specifies a branch condition, and wherein creating the second block comprises replacing the conditional branch instruction with an instruction that sets a flag depending on an outcome of the branch condition, and replacing one or more of the instructions of the first block with one or more conditional instructions having an execution condition that depends on the flag.

5. The method according to claim 1, wherein the conditional branch instruction specifies a branch condition, and wherein creating the second block comprises replacing one or more of the instructions of the first block with one or more alternative instructions that write to one or more non-architectural registers of the processor, and adding to the second block one or more instructions that choose, depending on an outcome of the branch condition, at least one non-architectural register from which to read.

6. The method according to claim 1, wherein the conditional branch instruction specifies a branch condition, and wherein creating the second block comprises replacing the conditional branch instruction with an instruction that sets a flag depending on an outcome of the branch condition, and executing the instructions in the first block conditionally depending on the flag.

7. The method according to claim 1, wherein processing the sequence of the instructions comprises predicting a future flow-control trace of the sequence and fetching the instructions in accordance with the predicted flow-control trace, and wherein creating the second block comprises preventing prediction of at least one of the first and second flow-control traces.

8. The method according to claim 1, wherein creating the second block comprises preventing the conditional branch instruction from diverging the execution of the instructions into the first and second flow-control traces.

9. The method according to claim 1, wherein identifying the first block comprises deciding whether or not to replace the first block by the second block based on at least one parameter selected from a group of parameters consisting of:
   a number of the instructions in the first block;
   past branch decisions of the conditional branch instruction;
   past predictability of the conditional branch instruction;
   types of the instructions in the first block; and
   dependencies between instructions in the first block.

10. The method according to claim 1, and comprising, in response to meeting a predefined criterion, reverting back to executing the first block.

11. The method according to claim 1, wherein identifying the first block comprises forcing inspection of the different flow-control traces by overriding a branch condition specified in the conditional branch instruction, and inspecting the instructions in the different flow-control traces so as to decide whether or not to replace the first block by the second block.

12. The method according to claim 1, wherein identifying the first block comprises detecting that processing of the sequence follows one of the different flow-control traces that executes the instructions in the first block, and in response inspecting the instructions so as to decide whether or not to replace the first block by the second block.

13. The method according to claim 1, wherein the first block comprises at least one additional conditional branch instruction.

14. The method according to claim 1, wherein identifying the first block comprises identifying a program loop in which the conditional branch instruction serves as a loop branch, and wherein creating the second block comprises creating a first set of instructions that carry out a first iteration of the program loop unconditionally, and one or more second sets of instructions, which carry out respective subsequent iterations of the program loop and are each conditioned on an outcome of the loop branch in a previous iteration.

15. The method according to claim 14, wherein at least two iterations of the program loop differ in flow-control trace from one another.

16. The method according to claim 1, wherein the conditional branch instruction comprises an indirect branch, and wherein creating the second block comprises creating first instructions that follow the first flow-control trace and are conditioned on a first branch resolution of the indirect branch, and second instructions that follow the second flow-control trace and are conditioned on a second branch resolution of the indirect branch, different from the first branch resolution.

17. The method according to claim 1, wherein causing the pipeline to execute the second block comprises flushing one or more of the instructions of the second block, in response to an event that is different from misprediction of the conditional branch instruction.

18. A method, comprising:
in a processor, processing a sequence of pre-compiled instructions by an instruction pipeline of the processor;
identifying in the instructions flowing via the pipeline a first block of instructions, which comprises a conditional branch instruction that conditionally diverges execution of the instructions into at least first and second flow-control traces that differ from one another in multiple instructions and converge at a given instruction that is again common to the first and second flow-control traces;
creating by the processor, at runtime, a second block of instructions that is logically equivalent to the first block but replaces the first and second flow-control traces by a single flow-control trace; and
causing the pipeline to execute the second block instead of the first block,
wherein identifying the first block and creating the second block comprise:
upon a given occurrence of the first block, executing the instructions of the first block and creating the second block; and
upon a subsequent occurrence of the first block, causing the pipeline to execute the second block instead of the first block.

19. A processor, comprising:
an instruction pipeline, configured to process a sequence of pre-compiled instructions; and
circuitry, configured to identify in the instructions flowing via the pipeline a first block of instructions, which comprises a conditional branch instruction that conditionally diverges execution of the instructions into at least first and second flow-control traces that differ from one another in multiple instructions and converge at a given instruction that is again common to the first and second flow-control traces, to create, at runtime, a second block of instructions that is logically equivalent to the first block but replaces the first and second flow-control traces by a single flow-control trace, and to cause the pipeline to execute the second block instead of the first block, wherein the instructions in the second block cannot be flushed due to misprediction of the conditional branch instruction.

20. The processor according to claim 19, wherein one or more of the instructions in the second block comprise internal micro-ops that are not part of an instruction set of the processor.

21. The processor according to claim 19, wherein the conditional branch instruction specifies a branch condition, and wherein the circuitry is configured to create the second block by replacing one or more of the instructions of the first block with one or more conditional instructions having an execution condition that is a complement of the branch condition.

22. The processor according to claim 19, wherein the conditional branch instruction specifies a branch condition, and wherein the circuitry is configured to create the second block by replacing the conditional branch instruction with an instruction that sets a flag depending on an outcome of the branch condition, and replacing one or more of the instructions of the first block with one or more conditional instructions having an execution condition that depends on the flag.

23. The processor according to claim 19, wherein the conditional branch instruction specifies a branch condition, and wherein the circuitry is configured to create the second block by replacing one or more of the instructions of the first block with one or more alternative instructions that write to one or more non-architectural registers of the processor, and adding to the second block one or more instructions that choose, depending on an outcome of the branch condition, at least one non-architectural register from which to read.

24. The processor according to claim 19, wherein the conditional branch instruction specifies a branch condition, and wherein the circuitry is configured to create the second block by replacing the conditional branch instruction with an instruction that sets a flag depending on an outcome of the branch condition, and executing the instructions in the first block conditionally depending on the flag.

25. The processor according to claim 19, wherein the circuitry is configured to predict a future flow-control trace of the sequence and fetch the instructions in accordance with the predicted flow-control trace, and, by creating the second block, preventing prediction of at least one of the first and second flow-control traces.

26. The processor according to claim 19, wherein the circuitry is configured to create the second block by preventing the conditional branch instruction from diverging the execution of the instructions into the first and second flow-control traces.

27. The processor according to claim 19, wherein the circuitry is configured to decide whether or not to replace the first block by the second block based on at least one parameter selected from a group of parameters consisting of:
a number of the instructions in the first block;
past branch decisions of the conditional branch instruction;
past predictability of the conditional branch instruction;
types of the instructions in the first block; and
dependencies between instructions in the first block.

28. The processor according to claim 19, wherein the circuitry is configured to revert back to executing the first block in response to meeting a predefined criterion.

29. The processor according to claim 19, wherein the circuitry is configured to force inspection of the different flow-control traces by overriding a branch condition specified in the conditional branch instruction, and to inspect the instructions in the different flow-control traces so as to decide whether or not to replace the first block by the second block.

30. The processor according to claim 19, wherein the circuitry is configured to detect that processing of the sequence follows one of the different flow-control traces that executes the instructions in the first block, and in response to inspect the instructions so as to decide whether or not to replace the first block by the second block.

31. The processor according to claim 19, wherein the first block comprises at least one additional conditional branch instruction.

32. The processor according to claim 19, wherein the circuitry is configured to identify the first block by identifying a program loop in which the conditional branch instruction serves as a loop branch, and to create the second block by creating a first set of instructions that carry out a first iteration of the program loop unconditionally, and one or more second sets of instructions, which carry out respective subsequent iterations of the program loop and are each conditioned on an outcome of the loop branch in a previous iteration.

33. The processor according to claim 32, wherein at least two iterations of the program loop differ in flow-control trace from one another.

34. The processor according to claim 19, wherein the conditional branch instruction comprises an indirect branch, and wherein the circuitry is configured to create the second block by creating first instructions that follow the first flow-control trace and are conditioned on a first branch resolution of the indirect branch, and second instructions that follow the second flow-control trace and are conditioned on a second branch resolution of the indirect branch, different from the first branch resolution.

35. The processor according to claim 19, wherein the circuitry is configured to flush one or more of the instructions of the second block, in response to an event that is different from misprediction of the conditional branch instruction.

36. A processor, comprising:
an instruction pipeline, configured to process a sequence of pre-compiled instructions; and
circuitry, configured to identify in the instructions flowing via the pipeline a first block of instructions, which comprises a conditional branch instruction that conditionally diverges execution of the instructions into at least first and second flow-control traces that differ from one another in multiple instructions and converge at a given instruction that is again common to the first and second flow-control traces, to create, at runtime, a second block of instructions that is logically equivalent to the first block but replaces the first and second flow-control traces by a single flow-control trace, and to cause the pipeline to execute the second block instead of the first block,
wherein the circuitry is configured to identify the first block and create the second block by:
upon a given occurrence of the first block, executing the instructions of the first block and creating the second block; and
upon a subsequent occurrence of the first block, causing the pipeline to execute the second block instead of the first block.

* * * * *